United States Patent [19]

Weber

[11] 4,205,412
[45] Jun. 3, 1980

[54] AUTOMOTIVE BRAKE DUST RECOVERY UNIT

[76] Inventor: Ronald W. Weber, 13422 Gilbert St., Garden Grove, Calif. 92644

[21] Appl. No.: 966,140

[22] Filed: Dec. 4, 1978

[51] Int. Cl.² ............................................. A47L 5/14
[52] U.S. Cl. ...................................... 15/345; 15/420; 55/243; 55/259
[58] Field of Search ................. 15/321, 322, 345, 346, 15/420, 339, 333; 55/232, 234, 243, 259

[56] References Cited

U.S. PATENT DOCUMENTS

| | | | |
|---|---|---|---|
| 3,222,707 | 12/1965 | Allenbaugh | 15/345 |
| 3,262,146 | 7/1966 | Hays | 15/321 |
| 3,487,620 | 1/1970 | Klein et al. | 55/234 X |
| 3,856,487 | 12/1974 | Perez | 55/233 X |
| 4,107,816 | 8/1978 | Matthews | 15/322 X |
| 4,133,658 | 1/1979 | Callewyn | 15/314 X |
| 4,135,894 | 1/1979 | Himes et al. | 55/234 X |

FOREIGN PATENT DOCUMENTS

2643067 3/1978 Fed. Rep. of Germany ............ 15/345
2346061 10/1977 France ...................................... 15/345

*Primary Examiner*—Christopher K. Moore
*Attorney, Agent, or Firm*—William C. Babcock

[57] ABSTRACT

A movable brake dust recovery unit that may be disposed adjacent an automotive shaft after the wheel has been removed therefrom, and thereafter subject the backing plate and associated brake shoe assemblies to a current of air to remove particled foreign material therefrom. The current of air with entrained dust and particled foreign material is directed into a confined space where the air is washed and then subjected to the action of a filter. The washed and filtered air may then be safely discharged to the ambient atmosphere without danger of contaminating the same. During the above-described operation the brake shoe assemblies and the interior of the brake drum are subjected to a rotating blast of air to separate dust and foreign material therefrom, with the separated dust and foreign material being subsequently entrained with a current of air and carried into the confined space.

4 Claims, 5 Drawing Figures

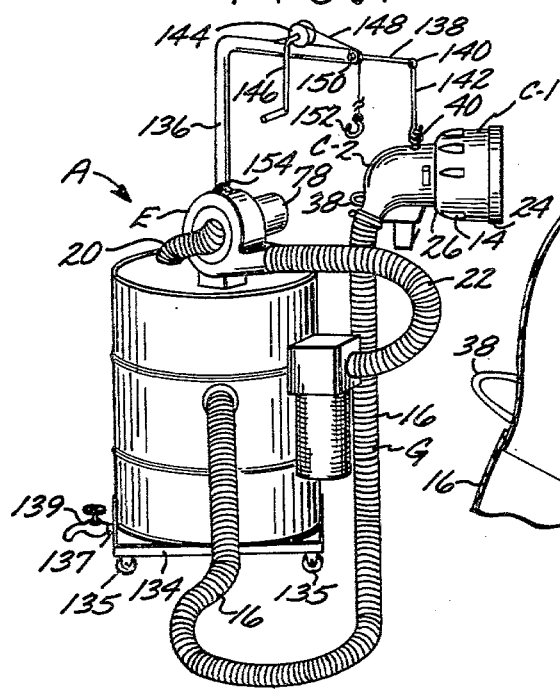
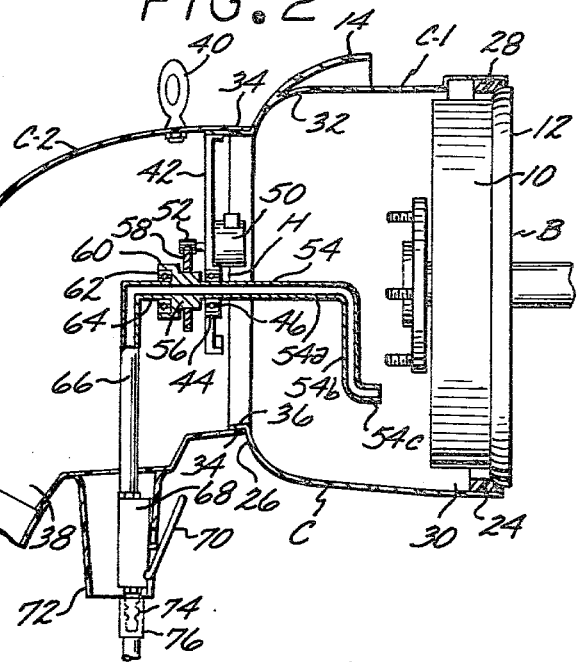
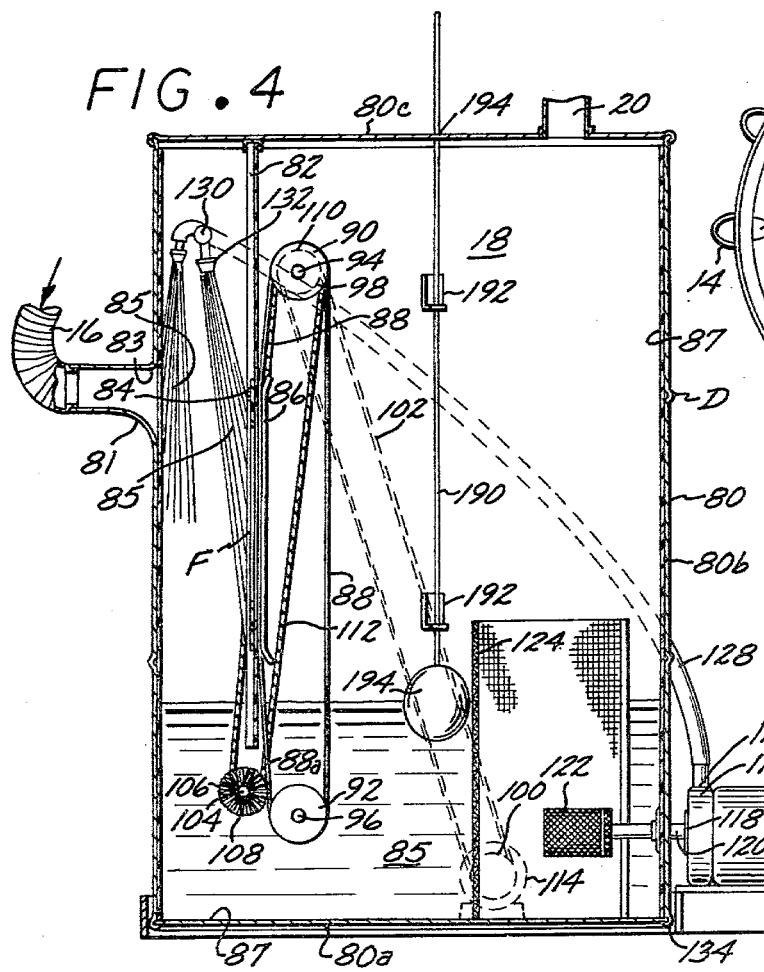
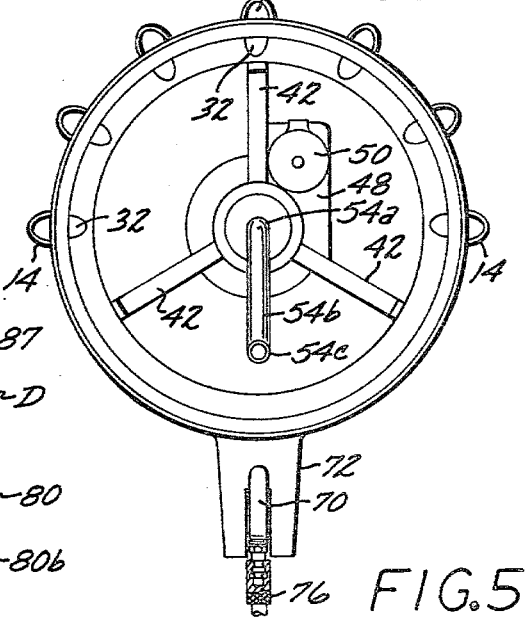
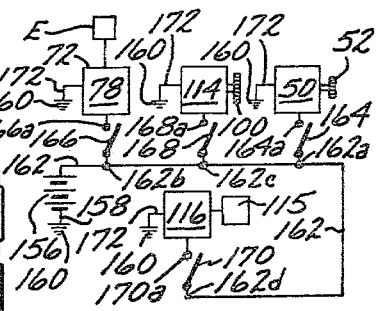

AUTOMOTIVE BRAKE DUST RECOVERY UNIT

BACKGROUND OF THE INVENTION

1. Field of the Invention

Automotive Brake Dust Recovery Unit.

2. Description of the Prior Art

In the servicing of the brakes of an automotive vehicle the brake drum, backing plate and shoe assemblies are invariably found to have dust and foreign particled material associated therewith, and at least a portion of the particled material being asbestos or an asbestos containing material. Asbestos has been found to be highly detrimental when breathed, and in many states it is mandatory that asbestos dust not be allowed to escape to the ambient atmosphere.

A major object of the present invention is to provide an apparatus that may be moved to a position adjacent a brake assembly after the wheel associated with the assembly has been removed therefrom, with the apparatus then being removably secured to the brake assembly to subject the latter to a current of air to separate dust and particled foreign material therefrom with the current of air with entrained particled material being directed to a confined space within a tank where it is subjected to a washing operation, and the washed air then being subjected to a filtering operation prior to being discharged to the ambient atmosphere.

Another object of the invention is to supply a brake dust recovery unit that not only separates dust and particled material from a brake drum assembly by subjecting the latter to a current of air, but in addition also separates dust and particled material from the drum by subjecting the interior of the drum and the brake shoe assemblies therein to a rotating blast of air.

Yet another object of the invention is to supply a brake dust recovery unit that removes dust and particled foreign material from a brake drum assembly, and permits maintenance work to be performed on the brake drum assembly without danger of the person carrying out this maintenance work breathing air contaminated with dust and particled foreign material that may in whole or in part be asbestos fibers or fibers containing a substantial quantity of asbestos.

SUMMARY OF THE INVENTION

The invention includes a movable base that supports a tank, a motor driven vacuum pump, and a motor driven water pump. A first flexible hose is connected to the suction side of the vacuum pump, with the free end of the hose having a hood assembly thereon that may be removably attached to an automotive wheel assembly after the wheel has been removed therefrom. When the vacuum pump is operated, an air stream is drawn through the hood through air scoops provided therein to flow over the interior of the brake assembly to remove dust and foreign particled material therefrom, with the air stream having the removed particled material therein being discharged into a confined space defined in the tank.

The tank contains a quantity of water, which water when the motor driven water pump is operating is recirculated to discharge as a spray over a removable screen situated within the confined space through which the air with entrained foreign particles flows, and the air spray removing the major portion of the particled material from the air stream. After the air stream has been subjected to the action of the water spray, the air stream discharges to a filter that is of sufficiently fine mesh as to remove any foreign entrained material from the airstream prior to the air stream being discharged to the ambient atmosphere.

During the removal of dust and foreign particled material from the interior of the brake drum assembly as above-described, the interior of the brake drum and the brake shoe assemblies therein is subjected to a rotating blast of air that separates dust and foreign particled material from the interior of the drum and from the brake shoe assemblies that tend to adhere thereto and would not be removed simply by the action of a stream of air flowing thereover. After dust and foreign particled material has been removed from the brake drum assembly as above-described, the hood is removed therefrom, and the wheel may now be repositioned on the supporting shaft. Due to action of the brake dust recovery unit, maintenance work may be performed on a brake assembly, without danger of the person conducting the maintenance operation breathing air that is contaminated with foreign particled material that may in whole or in part be defined by asbestos or asbestos containing material.

BRIEF DESCRIPTION OF THE DRAWING

FIG. 1 is a perspective view of the brake dust recovery unit;

FIG. 2 is a longitudinal cross-sectional view of the hood portion of the brake dust recovery unit and with the same removably secured to the exterior of a brake drum;

FIG. 3 is an end elevational view of the hood assembly;

FIG. 4 is a vertical cross-sectional view of the tank portion of the brake dust recovery unit; and FIG. 5 is a schematic wiring diagram of the electric circuit used in the invention.

DESCRIPTION OF THE PREFERRED EMBODIMENT

The automotive brake dust recovery unit A is shown in perspective is FIG. 1. The invention A is used to remove dust and foreign particled material from an automotive wheel support assembly B illustrated in FIG. 2, which assembly includes brake shoes 10 and backing plate 12. A generally cylindrical hood C is provided that has circumferentially spaced air scoops 14 defined on the exterior thereof, and the hood being connected to a first conduit 16 that is in communication with a confined space 18 defined within a tank assembly D as shown in FIG. 4. The tank assembly D is illustrated as supporting a vacuum pump E that has the suction side thereof connected to the confined space 18 by a second conduit 20.

A combined movable screen and wash assembly F is situated within the confined space 18 and serves to remove dust and foreign material from a stream of air that is drawn through the air scoops 14 and has dust and foreign material from the automotive wheel support assembly B entrained therewith. The discharge of the vacuum pump E is connected to a third conduit 22 that extends to a filter assembly G as may be seen in FIG. 1. The filter assembly G serves to remove any entrained dust or particled material that is not removed from the stream of air by the combined screen and wash assembly F in the confined space 18. When the air discharges from the filter assembly G to the ambient atmosphere, all entrained dust or particled material previously associated therewith has been removed either by the screen and wash assembly F or the filter assembly G.

The hood C as may best be seen in FIG. 2 includes a first portion C-1 that is formed from a pliable sheet material, such as plastic or the like, and has a generally cylindrical shape. The first hood portion C-1 has a first end 24 and second end 26. The first end 24 has a resilient band 28 situated therein, which band tends to maintain the first hood portion C-1 in a transverse circular configuration. The band 28 has an internal diameter such that it slidably and snugly engages the external surface of the backing plate 12 as may be seen in FIG. 2.

A ring-shaped seal 30 is situated within the first hood portion C-1 adjacent the first end 24 thereof, with the seal 30 having an internal diameter such that it slidably and sealingly engages the exterior surface of the brake shoe 10. The hood C is preferably manually mounted on the backing plate 12 and held thereon during the recovery of dust and foreign particled material from the backing plate 12, the interior of the shoes 10, and the brake cylinder assemblies (not shown) situated within the brake shoes. The air scoops 14 develop into openings 32 formed in the hood portion C-1 and through which openings air is drawn from the ambient atmosphere as a stream to remove dust and foreign particled material from the interior of the brake shoes. The hood C also includes a second portion C-2 as may be seen in FIG. 2 that is of generally L-shape and formed from a rigid material. The second hood portion C-2 includes a first end portion 34 that has a cylindrical flange 36 that forms a part of the first hood portion C-1 bonded to the interior surface thereof. The second hood portion C-2 develops into a second end portion 38 that is of substantially smaller transverse cross section than the first end portion 34 as may be seen in FIG. 2. The second hood portion C-2 has an eye bolt 40 extending upwardly therefrom, the purpose of which will later be explained. A transverse spider 42 is disposed within the second hood portion C-2 adjacent the first end 34 thereof, with the spider including a hub 44 in which a bearing 46 is supported. The spider 42 has a plate 48 secured thereto on which a first electric motor 50 is mounted as may best be seen in FIG. 3.

The first electric motor 50 includes a drive gear 52. A tubular member 54 is rotatably supported in the bearing 46, and this tubular member including a first straight portion 54a, a second portion 54b that is substantially normal to the first portion, and a third portion 54c that is normal to the free end of the second portion 54b. The first tubular portion 54a has a cylindrical body 56 mounted on the free end portion thereof as shown in FIG. 2, and this body 56 having a driven gear 58 secured thereto, and the driven gear being in toothed engagement with the driving gear 52. A cylindrical rib 60 extends outwardly from the body 56 away from the spider 42, with the rib supporting a bearing 62 that includes inner and outer races. The inner race of the bearing 62 is secured to a first horizontal tube 64 that develops into a second vertically extending tube 66 as illustrated in FIG. 2. The second tube 66 communicates with a normally closed valve 68 that is placed in the open position by use of a handle 70. The valve 68 is supported in a fixed position relative to the hood C by a cylindrical support 72 that extends downwardly from the second hood portion C-2 as shown in FIG. 2. The valve 68 is by a fitting 74 connected to a flexible conduit 76 that extends to a source of pressurized air that will normally be available in establishments in which brake assemblies of automobiles are serviced.

The vacuum pump E as may be seen in FIG. 1 is actuated by a second electric motor 78. The tank assembly D as may be seen in FIGS. 1 and 4 includes a tank 80 that has a bottom 80a, a cylindrical side wall 80b, and a top 80c. A tubular fitting 81 extends outwardly from the interior of the tank 80 and has the first conduit 16 connected thereto by conventional means as may be seen in FIG. 4. Air with entrained dust and particled foreign material from the automotive wheel support assembly B discharges through the fitting 81 and an opening 83 formed in the side wall 80b into the confined space 18. The top 80c supports a downwardly extending partition 82 formed from a rigid material, which partition has the lower end thereof situated below the surface of a body of water 85 that is situated in the tank 80 as shown in FIG. 4. The partition 82 has an opening 84 formed therein intermediate the top and bottom thereof, and the opening on each side having a vertically extending guide 86 that slidably engages a first vertically extending reach of an endless belt 88 formed from a screen. The endless belt 88 is rotatably supported on a transverse upper roller 90 and a transverse lower roller 92, with the upper roller being secured to a transverse first shaft 94 that has the ends thereof journaled in oppositely disposed portions of the side wall 80b. The lower roller 92 is mounted on a second transverse shaft 96 that has the ends thereof journaled in oppositely disposed portions of the side wall 80b. The longitudinal edges of the reach 88a of the endless belt 88 that is adjacently disposed to the partition 82 has the longitudinal edges of the reach slidably engaged by the guides 86. The first shaft 94 projects outwardly from the side wall 80b and has a first sprocket 98 mounted thereon. An endless chain belt 102 engages the first sprocket 98 and also a second sprocket 100. The second sprocket 100 is driven by a third electric motor 114 as may be seen in FIG. 4. A third transverse shaft is rotatably supported within the confined space 18 and is adjacently disposed to the second shaft 96. The third shaft 104 as shown in FIG. 4 supports a cylindrical brush 106 that rotatably pressure contacts the first reach 88a of endless screen belt 88, and the brush as it rotates serving to remove dust and foreign particled material from the belt and the dislodged material passing into the body of water 85. The third shaft 104 extends outwardly from the side wall 80b and has a third sprocket 108 mounted thereon, which sprocket engages a second endless chain belt 104 that extends upwardly to a fourth sprocket 110 mounted on the first shaft 94. When the third motor 114 is energized, the endless screen belt 88 is rotated as is the brush 106.

In FIG. 4 it will be seen that the invention A includes a water pump 115 that is driven by a fourth electric motor 116. The water pump 115 as may be seen in FIG. 4 has an inlet 118 which by a conduit 120 is connected to a strainer 122 situated within the confined space 18 adjacent the bottom 80a of tank 80. The strainer 122 is situated within the confines of a cylindrical screen 124 that extends upwardly from the bottom 80a. Pump 115 has a discharge outlet 126 that is connected to a conduit 128 that extends upwardly adjacent to the exterior of the tank 80 to communicate with a transverse header 130 that is intermediately disposed between the upper portion of the side wall 80b and the partition 82 as shown in FIG. 4. The header 130 has a number of transversely spaced downwardly extending nozzles in communication with the interior thereof, which nozzles direct sprays of water 133 downwardly over the reach 88a of the screen belt 88 as the belt moves downwardly past the opening 84 in the partition 82. The stream of air as it is drawn into the confined space 18 through the opening 83 due to the vacuum pump E maintaining a negative pressure in the confined space impinges on the screen 88 as it moves by the opening 84, and concurrently the sprays of water 85 are directed onto the screen to wash the incoming stream of air and separate dust and foreign particled material therefrom. The sprays of water tend to separate the dust and foreign particled material from the incoming stream of air and this dust and particled material being directed downwardly into the body of water 85. Dust or foreign material that adheres to the downwardly moving belt reach 88a is separated therefrom by the rotating brush 106. The body of water 85 is constantly recirculated through the invention a by the pump 115 as can be seen in FIG. 4. The tank 80 and the pump 115 with associated electric motor 116 are supported on a base 134 and the base in turn being movably supported on a number of rollers or casters 135. The tank 80 adjacent the bottom 88 is provided with a drain 137 through which water contaminated with dust and particled material may be discharged from the tank 80 when a valve 139 is opened as shown in FIG. 1.

The invention A as can be seen in FIG. 1 includes an inverted L-shaped tubular support 136 that has a horizontal rod 138 telescopically movable therein, with the rod on the free outer end portion thereof having a pivotal connection 140 from which a hook 142 depends. The hook 142 may removably engage the eye 40 as shown in FIG. 1 to support the hood C in a convenient position prior to the hood being secured to an automotive wheel support assembly B. The support 136 has a winch 144 mounted on an upper horizontal portion thereof which winch is manually actuated by use of a crank 146. The winch supports a cable 148 that extends downwardly over a roller 150 mounted on the free end of the horizontal portion of the support 136 and the cable on the downwardly extending end thereof having a hook 152 secured thereto. The hook 152 may removably engage an eye bolt 154 that extends upwardly from the vacuum pump E, and by use of the winch the top 80c the vacuum pump E and the motor 78 may be moved upwardly relative to the tank 80 to permit access to the interior thereof for cleansing purposes or the like.

The electric circuit used in actuating the invention A is shown in FIG. 5. A source of electric power 156 is provided that by a conductor 158 has one terminal thereof connected to a ground 160, and the other terminal of the source of electric power being connected to an electrical conductor 162. The electrical conductor 162 has junction points 162a, 162b, 162c and 162d therein. The junction points 162a, 162b, 162c and 162d are connected to first, second, third and fourth normally open electric switches 164, 166, 168, and 170. The first, second, third and fourth electric motors 50, 78, 114 and 116 have first terminals thereof connected by conductors 172 to ground 160. The first, second, third and fourth switches 164, 166, 168 and 170 include first, second, third and fourth contacts 164a, 166a, 168a and 170a that are electrically connected to second terminals of the first, second, third and fourth motors 50, 78, 114 and 116. When the first, second, third or fourth switches 164, 166, 168 or 170 are closed, the first, second, third and fourth electric motors 50, 78, 114 and 116 associated therewith are energized and the invention A is in an operating condition. To prevent rust the interior surface of the bottom 80a and the side wall 80b of tank 80 is preferably coated with a water impervious film of plastic 87 or the like. The level of the body of water 85 in the tank 80 is visually indicated by vertically movable rod 190 that is slidably supported by brackets 192 secured to the interior surface of the side wall 80b with the rod extending upwardly through an opening 194 in the top 80c of tank 80. The lower end of the rod 190 has a float 194 secured thereto and as the level of the body of water 85 in the tank varies the portion of the rod 190 extending upwardly above the top 80c will likewise vary, and visually indicate to the operator the quantity of water within the tank.

The use and operation of the invention is as follows. The invention A is moved adjacent the automotive wheel support assembly B, and the wheel removed from the assembly. The hood C is caused to slidably and sealingly engage the exterior surface of the backing plate 12 as shown in FIG. 2. The second, third and fourth electric switches 166, 168 and 170 are now closed to energize the second motor 78, third motor 114 and fourth motor 116. The second motor 78 drives the vacuum pump E, to drop a stream of air through the air scoops 14 over the automotive wheel support assembly B to dislodge dust and particled foreign material therefrom, due to the vacuum pump creating a negative pressure within the confined space 18 of the tank assembly D. The air stream with the entrained dust and particled material flows through the conduit 16 into the confined space 18 where it is subjected to the washing action of the sprays 85. The stream of air after being washed passes through the opening 84 and reach 88a of endless screen belt 88. Dust and foreign material impinge on reach 88a of belt 88 and are carried downwardly into the body of water 85 thereby, and remove from the belt by the rotating brush 106. The body of water 85 is continuously recirculated by the pump 126 to provide spray 85.

Air substantially free of dust and particled foreign material is withdrawn from the confined space 18 through conduit 20 by operation of pump E and discharged through conduit 22 to filter G. The filter G removes any remaining dust or particled foreign material from the stream of air, with the air then being discharged from the filter to the ambient atmosphere. From experience it has been found that some dust and particled material will not be dislodged from the interior of the brake shoes 10 by the stream of air drawn through the hood C. To dislodge such dust and particled foreign material the valve 68 is moved to the open position by use of handle 70. A strong jet of air discharges from the tubular member 54c onto the interior of brake shoes 10. The entire interior surface of the brake shoes may be subjected to such a jet by closing the first switch 164, with the first motor 50 now rotating tube 54 relative to brake shoes 10. The dust and particled foreign material dislodged by this jet of air is entrained with the stream of air that is concurrently being drawn into the confined space 18 through conduit 16.

After the dust and particled foreign material has been removed from the wheel support assembly B, the switches 164, 166, 168 and 170 are moved to the open position. The hood C is now removed from the backing plate 12, and disposed in a position to be supported from hook 142 as shown in FIG. 1 until again needed. The removed wheel (not shown) is now returned to its normal position on the wheel support assembly B. The above-described operation is sequentially performed on all of the wheel support assemblies of an automotive vehicle.

The use and operation of the invention has been explained previously in detail and need not be repeated.

What is claimed is:

1. In combination with a source of pressurized air and an automotive wheel support assembly that includes a circular backing plate, brake shoes, and brake shoe assemblies, a device for removing dust and particled foreign material from said backing plate, brake shoes and brake shoe assemblies that includes:
   a. a hood assembly that includes a first generally cylindrical portion formed from a pliable sheet material that slidably and sealingly engages said backing plate, and a second rigid tubular portion outwardly disposed from said first portion and in communication therewith, said first portion having a plurality of circumferentially spaced air scoops therein;
   b. a tank that defines a confined space therein, said tank capable of holding a body of water in the lower portion thereof;
   c. a first conduit that connects said second portion of said hood to a first opening in said tank above the level of said body of water therein;
   d. a vacuum pump disposed in a fixed position relative to said tank, said vacuum pump having an inlet and a discharge outlet, said inlet in communication with a second opening in said tank that is spaced from said first opening, said vacuum pump maintaining a negative pressure that causes a stream of air with entrained dust and particled foreign material to flow through said first conduit into said confined space;
   e. a plurality of nozzles disposed in said confined space intermediate said first and second openings and above said body of water;
   f. a power-driven water pump that has an inlet and an outlet, said inlet in communication with said body of water and said outlet in communication with said nozzles, said water pump recirculating said body of water through said nozzles to provide a plurality of sprays that wash said air entering said confined space to separate the major portion of said dust and particled foreign material therefrom prior to said air flowing through said second opening;
   g. a filter in communication with said discharge of said vacuum pump that removes all remaining dust and foreign material from air withdrawn from said confined space prior to said air being discharged to the ambient atmosphere;
   h. power driven rotatable tubular means in said first portion of said hood;
   i. a normally closed valve in communication with said source of pressurized air and said rotatable tubular means, said valve when opened causing a jet of pressurized air to be directed over a circular path onto the interior of said wheel support assembly to dislodge dust and foreign particled material therefrom, with said dislodged material becoming entrained with said stream of air and carried into said confined space;
   j. a top mounted on said tank;
   k. a partition that depends from said top and extends below the surface of said body of water, said partition disposed intermediate said first and second openings, and said partition having an opening therein above the surface of said body of water;
   l. an endless vertically extending belt of screen in said tank, said belt including a first reach that is adjacently disposed to said partition and covers said opening, and said screen that covers said opening having said sprays of water directed thereon;
   m. roller means in said tank for rotatably supporting said endless belt of screen; and
   n. power means for rotating said endless belt of screen for said reach to move downwardly towards said body of water, with dust and foreign particled material removed from said stream of air by said sprays being deposited on said screen and separated therefrom as said screen moves through said body of water.

2. A device as defined in claim 1 which in addition includes:
   o. a rotatable generally cylindrical brush disposed in said confined space and below the surface of said body of water, said brush in pressure contact with said reach of said endless screen belt, with said brush being rotated by said power means, and said brush dislodging dust and particled foreign material from said endless screen belt into said body of water.

3. A device as defined in claim 1 in which said top has said vacuum pump mounted on said top and said top removable from said tank, and said device in addition including;
   p. a base that supports said tank;
   q. roller means that movably support said base;
   r. an upright secured to said base;
   s. first means for removably supporting said hood from said upright when said hood is not in use.

4. A device as defined in claim 3 which in addition includes:
   t. winch means on said upright for lifting said top and vacuum pump from said tank to permit inspection of the interior of the latter.

* * * * *